(12) United States Patent
Basu et al.

(10) Patent No.: US 8,880,489 B2
(45) Date of Patent: Nov. 4, 2014

(54) DISCOVERY ACROSS MULTIPLE REGISTRIES

(75) Inventors: Sujoy Basu, Menlo Park, CA (US);
Sujata Banerjee, Sunnyvale, CA (US);
Shishir Garg, Mountain View, CA (US);
Sukesh Garg, San Jose, CA (US);
Sung-Ju Lee, Los Altos, CA (US);
Pramila Mullan, Los Gatos, CA (US);
Puneet Sharma, Palo Alto, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 2359 days.

(21) Appl. No.: 11/198,806

(22) Filed: Aug. 4, 2005

(65) Prior Publication Data

US 2007/0033167 A1 Feb. 8, 2007

(51) Int. Cl.
*G06F 7/00* (2006.01)
*G06F 17/30* (2006.01)

(52) U.S. Cl.
CPC .............................. *G06F 17/30864* (2013.01)
USPC ........... 707/705; 707/718; 707/770; 709/201; 709/223; 709/224

(58) Field of Classification Search
None
See application file for complete search history.

(56) References Cited

U.S. PATENT DOCUMENTS

| | | | |
|---|---|---|---|
| 6,112,209 A * | 8/2000 | Gusack | 707/101 |
| 6,985,939 B2 * | 1/2006 | Fletcher et al. | 709/223 |
| 7,349,980 B1 * | 3/2008 | Darugar et al. | 709/238 |
| 2003/0191802 A1 * | 10/2003 | Zhao et al. | 709/203 |
| 2004/0039738 A1 | 2/2004 | Cutlip | |
| 2004/0049483 A1 | 3/2004 | Dewilde | |
| 2004/0054690 A1 | 3/2004 | Hillerbrand et al. | |
| 2004/0236633 A1 * | 11/2004 | Knauerhase et al. | 705/26 |
| 2005/0240591 A1 * | 10/2005 | Marceau et al. | 707/9 |
| 2006/0041560 A1 * | 2/2006 | Forman et al. | 707/10 |

OTHER PUBLICATIONS

Karl Alberer, et al., "P-Grid: A Self-Organizing Structured P2P System", Distributed Information Systems Laboratory, 2003, Switzerland.

Karl Alberer, et al., "GridVine: Building Internet-Scale Semantic Overlay Networks", The Third International Semantic Web Conference, 2004, EPEL Center and NCCR-MIC, Sweden.

Francisco Matias Cuenca-Acuna, et al., "PlanetP: Using Gossiping to Build Content Addressable Peer-to Peer Information Sharing Communities", The 12th International Symposium on High Performance Distributed Computing, Jun. 2003, New Jersey.

Francisco Matias Cuenca-Acunn and Thu D. Nguyen., "Self-Managing Federated Services", The 23rd IEEE International Symposium on Reliable Distributed Systems, 2004, Florianpolis, Brazil.

(Continued)

*Primary Examiner* — Fred I Ehichioya
*Assistant Examiner* — Hasanul Mobin (57) ABSTRACT

One embodiment relates to a system for linking together multiple registries and aggregating data from the multiple registries. The system includes a plurality of local resource or service (resource/service) registries, a distributed index storage and retrieval system, and at least one proxy registry. The proxy registry is configured to receive a search query from a client system, retrieve information from the distributed index storage and retrieval system as to which of the local resource/service registries are relevant to the search query, and obtain pertinent entries from said relevant resource/service registries. Other embodiments are also disclosed.

19 Claims, 7 Drawing Sheets

(56) References Cited

OTHER PUBLICATIONS

Ian Foster and Adriana Iamnitchi, "On Death, Taxes, and the Convergence of Peer-to-Peer and Grid Computing", The $2^{nd}$ International Workshop on Peer-to-Peer Systems, 2003, US.

Fred Hartman Harris Reynolds, "Was the Universal Service Registry a Dream?", The Web Services Journal, Dec. 2004.

Antony Rowstron and Peter Druschel "Pastry: Scalable, Decentralized Object Location and Routing for Large-Scale Peer-to-Peer System", The $18^{th}$ IFIP/ACM Middleware, Nov. 2001, Germany.

Karl Czajkowski, et al., 'Grid Information Services for Distributed Resource Sharing', Proc. $10^{th}$ IEEE International Symposium on High Performance Distributed Computing, IEEE Press, 2001.

Sean Rhea, et al., "Handling Churn in a DHT", Proc. of the USENIX Annual Technical Conference. Jun. 2004, California.

Hongsuda Tangmunarunkit, et al., "Ontology-Based Resource Matching in the Grid—The Grid Meets the Semantic Web", In Proc. of the $2^{nd}$ International Semantic Web conference, 2003, Florida.

MSDN, Web Services Dynamic Discovery (WS-Discovery) Specification, Feb. 2004.

* cited by examiner

DISCOVERY ACROSS MULTIPLE REGISTRIES

FIELD OF THE INVENTION

The present invention relates generally to communication networks. More particularly, the present invention relates to information registries in communication networks.

BACKGROUND

Efficient discovery of web services which may cross organizational boundaries is desirable both for business viability and rich consumer experience. An industry standard called Universal Description, Discovery and Integration (UDDI) was created to address this need. However, even though UDDI has been the de facto industry standard for web-services discovery, widespread deployment and usage of UDDI have so far been limited.

Various problems appear to have contributed to the limited deployment and usage of UDDI. These problems include, for example, the imposed requirements of tight replication of a UDDI registry and the lack of autonomous control over the registries. It is particularly desirable to improve and enhance UDDI to overcome the above-mentioned problems.

More generally, it is highly desirable to improve systems and methods for the discovery of resources and services from registries in general.

SUMMARY

One embodiment of the invention relates to a system for linking together multiple registries and aggregating resource or service (resource/service) data from the multiple registries. The system includes a plurality of local resource/service registries, a distributed index storage and retrieval system, and at least one proxy registry. The proxy registry is configured to receive a search query from a client system, retrieve addresses of select local registries which have entries satisfying the search query from the distributed index storage and retrieval system, and obtain said entries from said select local registries.

Another embodiment relates to an apparatus configured as a proxy registry to extend and facilitate searching for registry information in a decentralized architecture. The apparatus includes processor-executable code configured to receive a search query from a client system. The apparatus also includes processor-executable code configured to retrieve addresses of select local registries which have entries satisfying the search query from the distributed index storage and retrieval system and processor-executable code configured to obtain said entries from said select local registries.

Another embodiment relates to a method of using a proxy to search for resources or services (resources/services) from a decentralized aggregation of local registries. The proxy receives a search query from a client system. The proxy then retrieves addresses of select local registries which have entries satisfying the search query from a distributed index storage and retrieval system and obtains said entries from said select local registries.

Another embodiment relates to a distributed index storage and retrieval system configured to link multiple local resource/service registries. The distributed index storage and retrieval system comprising a plurality of storage entries. Each storage entry comprising a data storage key, an address of a local resource/service registry, and at least one identifier for an entry in the local resource/service registry. The distributed index storage and retrieval system further comprises a function operating on a resource/service attribute to generate the data storage key.

Another embodiment relates to a method of adding a new local registry to a decentralized aggregation of local registries. The method includes authenticating the new local registry and getting entries from the new local registry. A function is applied to an attribute of each entry to generate data storage keys corresponding to the entries. The data storage keys are used to publish the entries to a distributed index storage and retrieval system. Another embodiment relates to a method of publishing a new resource or service (resource/service) to a decentralized aggregation of local registries. The new resource/service is published to a local registry, and a unique entry identifier is received from the local registry. A function is applied to generate a data storage key, and the data storage key is used to store an address of the local registry and the unique entry identifier in a distributed index storage and retrieval system.

Other embodiments are also disclosed.

DETAILED DESCRIPTION

Figure 1A:
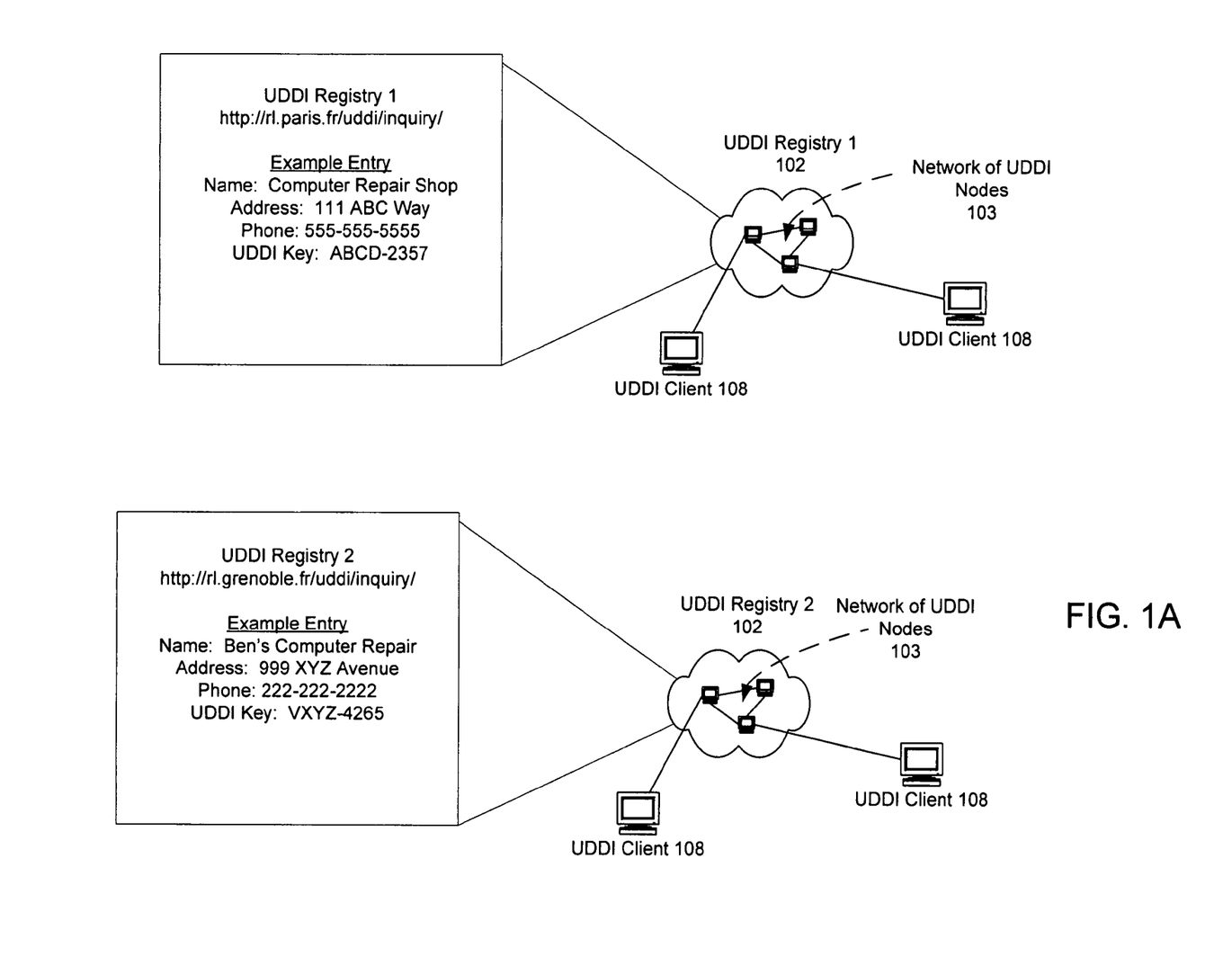
FIG. 1A is a schematic diagram depicting conventional registries for web services.

FIG. 1A is a schematic diagram depicting conventional registries for web services. In this particular example, two UDDI registries 102 (UDDI Registry 1 at query URL in a first domain "rl.Daris.fr" and UDDI Registry 2 at a query URL in a second domain "rl.grenoble.fr") are shown. Each UDDI registry 102 is replicated amongst a network 103 of UDDI nodes. A UDDI client 108 accesses a UDDI registry 102 by way of one of those UDDI nodes 103.

For purposes of illustration, an example entry is shown in each registry 102. The example entry in UDDI Registry 1 includes Computer Repair Shop in the name field, 111 ABC Way in the address field, 555-555-5555 in the phone number field, and ABCD-2357 in the UDDI key field. The example entry in UDDI Registry 2 includes Ben's Computer Repair in the name field, 999 XYZ Avenue in the address field, 222-

222-2222 in the phone number field, and VXYZ-4265 in the UDDI key field. Of course, each registry 102 may hold a multitude of such entries.

If a search query using the name term "repair" is sent to UDDI Registry 1 at the query URL in the first domain "rl.paris.fr", then the example Computer Repair Shop entry (along with other entries including "repair" in the name field) would be returned. If a separate search query using name term "repair" is sent to UDDI Registry 2 at the query URL in the second domain "rl.grenoble.fr"/, then the example Ben's Computer Repair entry (along with other entries including "repair" in the name field) would be returned.

Unfortunately, as discussed above in the Background, the conventional registries as shown in FIG. 1A have various problems and disadvantages. One problem is that the tight replication of the registry information limits the scalability of the system and increases system overhead. Another problem is that combining individual registries results in losing autonomous control over the registries due to the tight replication requirement.

In contrast to the conventional registries for web services shown in FIG. 1A, the present application discloses a distributed architecture to support large-scale discovery of services or resources. The architecture advantageously enables organizations to maintain autonomous control over their local service/resource registries (for example, UDDI registries) while still allowing clients to query multiple registries simultaneously. The clients need not be aware of the transparent proxy approach disclosed herein, and yet the clients get a richer and more complete response to their service queries.

The system and method of the present disclosure are not limited to scaling UDDI registries. They may also be applied more generally to other registries, such as Web-Services Directory (WSD) and other web service registries, grid registries, discovery solutions, and other resource registries. More generally, the present application discloses a system and method to link multiple registries and aggregate service or resource (service/resource) data from them. Furthermore, the present application discloses the use of proxy registries in a decentralized registry architecture. The leveraging of distributed data stores (for example, distributed hash tables) to link registries, and the leveraging of decentralized registries in the discovery of resources or services, are also disclosed.

Figure 1B:
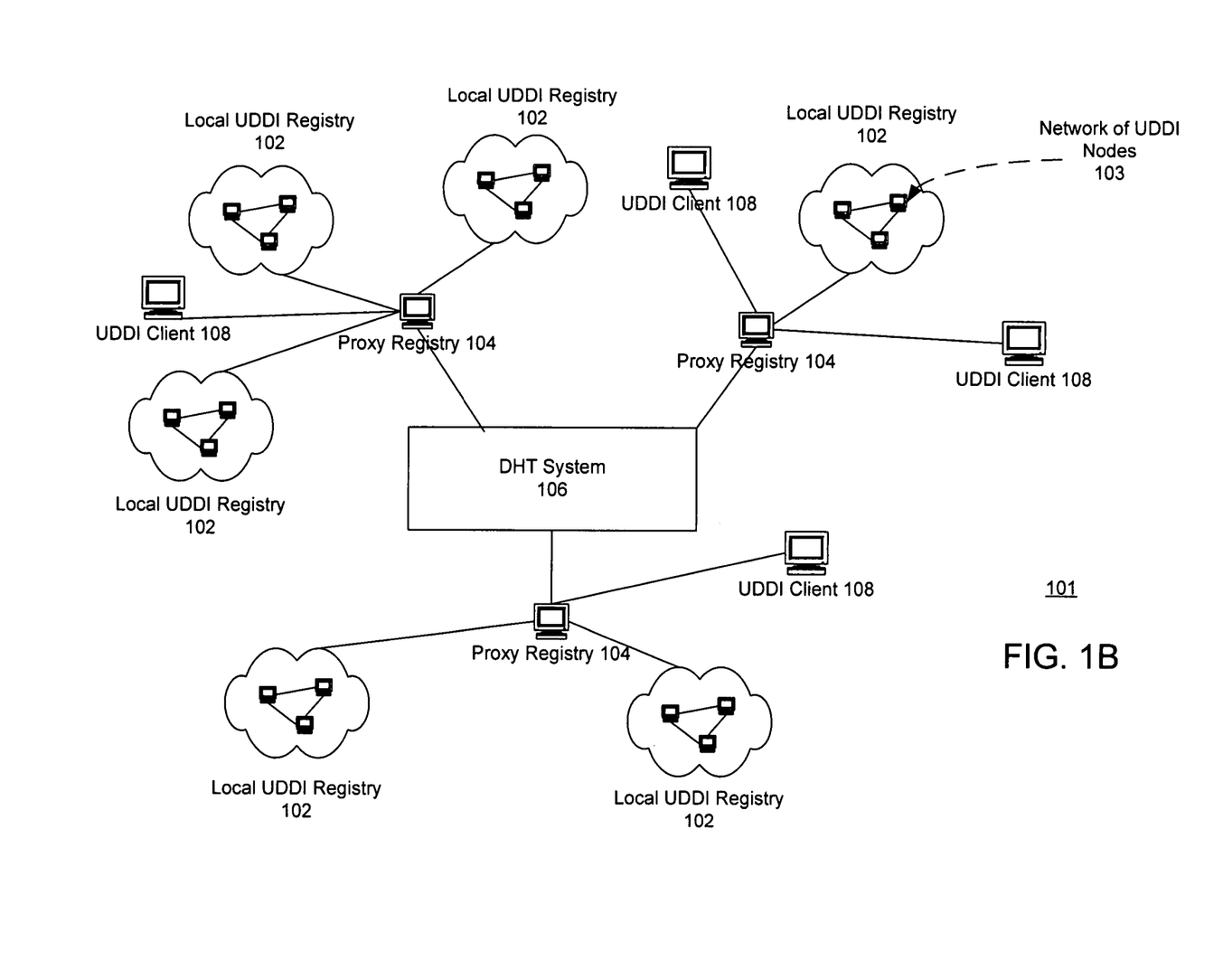
FIG. 1B is a schematic diagram depicting a system for linking multiple registries and aggregating resource/service data from the multiple registries in accordance with an embodiment of the invention. In the particular embodiment shown in FIG. 1B, the system facilitates the efficient discovery of web services/resources across multiple UDDI registries.

FIG. 1B is a schematic diagram depicting a system 101 for linking multiple registries and aggregating service/resource data therefrom in accordance with an embodiment of the invention. In the particular embodiment shown in FIG. 1B, the system 101 facilitates the efficient discovery of web services across multiple local UDDI registries 102. In other embodiments, the system 101 may be configured to apply to other registries (besides UDDI registries). Other registries include, but are not limited to, other web services registries, grid registries, discovery solutions.

Each local UDDI registry 102 remains replicated amongst its own network of UDDI nodes 103 as per the current UDDI standard. This aspect advantageously preserves compatibility with the current UDDI standard.

As shown in FIG. 1B, however, each local UDDI registry 102 within the system 101 is also communicatively interconnected to a proxy UDDI registry 104. There may be one or more proxy registries 104 in this architecture. Each proxy registry 104 is configured to mediate between one or more local UDDI registries 102 and the distributed hash table (DHT) system 106. Each proxy registry 104 is further configured to receive and respond to search queries from UDDI clients 108.

Advantageously, the ability to have multiple proxy registries 104 in this system architecture 101 enables distributed interactions between the UDDI clients 108 and the local UDDI registries 102. The DHT 106 may be considered as the "glue" that interconnects together the multiple proxy registries 104 and facilitates searching across the various local registries 102.

The DHT 106 comprises a peer-to-peer (P2P) distributed system and effectively comprises a hash table distributed over a set of participating nodes (not illustrated). As such, each proxy registry 104 does not need to know all the DHT nodes to utilize the DHT 106; it needs to "know" just one DHT node to utilize the DHT 106.

The DHT 106 maintains a collection of key-value pairs. A value may be retrieved from the DHT 106 using the associated DHT key. The value stored in the DHT 106 may be any data object or a copy or reference to it. The DHT keys are obtained from a large identifier space. A hash function, for example, such as MD5 or SHA-1, may be applied to a part of an object (for example, an object's name) to obtain the object's DHT key.

In accordance with a particular embodiment of the invention, the DHT 106 is configured to store service information objects pertaining to published web services. In other embodiments, the DHT 106 may be configured to store other service-related or resource-related information. In yet other embodiments, other distributed index storage and retrieval systems may be utilized, instead of the DHT 106. A distributed index storage and retrieval system (for example, a DHT) includes a distributed index structure and a mechanism for storage and retrieval of information to and from the structure.

Figure 2:
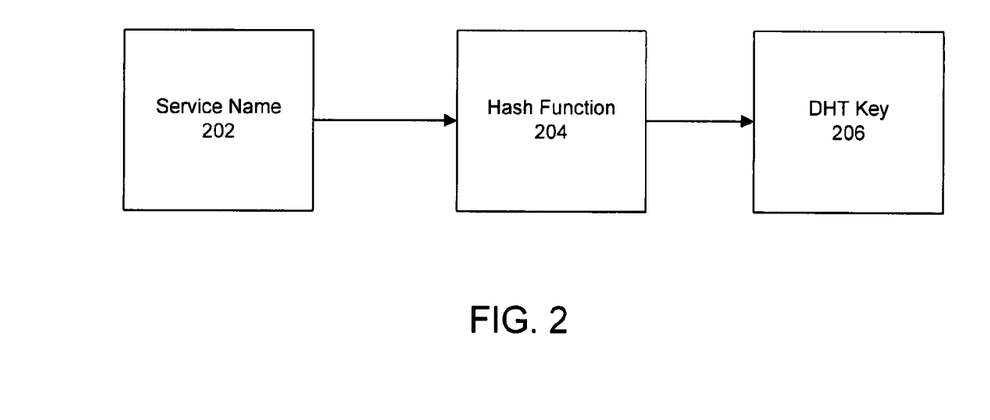
FIG. 2 depicts a key-value pair for a distributed hash table (DHT) in accordance with an embodiment of the invention.

As depicted in FIG. 2, the service name 202 may be used as the input to a hash function 204 so as to generate the DHT key 206 for storing the service information into the DHT 106. More generally, a resource or service (resource/service) name or other relevant searchable aspect relating to the resource or service may be used as the input to a function so as to generate the key for storing the resource/service information into the distributed index storage and retrieval system.

Figure 3:
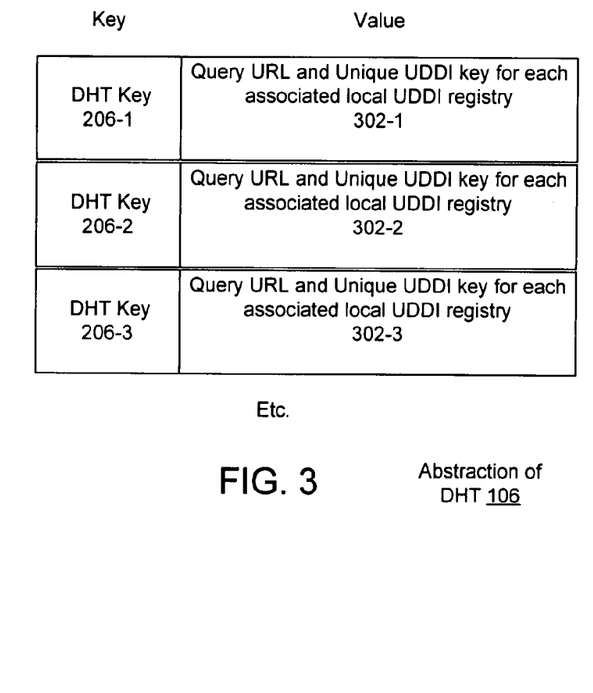
FIG. 3 depicts an abstraction of the DHT which shows the key-value pairs being stored therein in accordance with an embodiment of the invention.

FIG. 3 depicts an abstraction of the DHT 106 which shows the key-value pairs being stored therein in accordance with an embodiment of the invention. The table of FIG. 3 is an abstraction because the actual DHT 106 is distributed among various participating DHT nodes (rather than being a single table).

As shown in FIG. 3, each key-value pair comprises the DHT Key 206 and its associated value 302, including a reference to each of the local UDDI registries 102 containing relevant entries. In other words, each value 302 stored in the DHT 106 includes references to those local UDDI registries 102 containing relevant entries. Each reference to a relevant local UDDI registry 102 may comprise the query URL (universal resource locator) address and the unique UDDI key for that local UDDI registry 102.

More generally, each key-value pair comprises a key and its associated value, including a reference to each of the resource/service registries containing the relevant entries. In other words, each value stored in the distributed source includes reference to those resource/service registries containing relevant entries.

In one specific implementation, the values 302 stored in the DHT table 106 may comprise service information conforming to the following extended markup language (XML) schema.

```
<xs:schema xmlns:xs="http://www.w3.org/2001/XMLSchema"
elementFormDefault="qualified" attributeFormDefault="unqualified">
   <xs:element name="registries">
      <xs:annotation>
         <xs:documentation>Service Information</xs:documentation>
      </xs:annotation>
      <xs:complexType>
         <xs:sequence>
            <xs:element name="registry" maxOccurs="unbounded">
               <xs:complexType>
                  <xs:sequence>
                     <xs:element name="name"/>
                     <xs:element name="key" maxOccurs="unbounded"/>
                  </xs:sequence>
               </xs:complexType>
            </xs:element>
         </xs:sequence>
      </xs:complexType>
   </xs:element>
</xs:schema>
```

The above schema defines how the service information is stored in the DHT. The top-level tag called "registries" defines the information in the DHT regarding a single service. Each service can be associated with multiple registries. Hence, the XML element called "registry" can occur "unbounded" number of times, as indicated by the value of its "maxOccurs" attribute. The information stored for the service is a sequence of such registry elements, as indicated by the sequence tag enclosing the registry element. Each registry element associated with this service has the registry name (the element called "name") and a key (the element called "key") to access the service directly from the registry (described in FIG. 1A as UDDI Key). There can be multiple keys associated with a registry for a service, as indicated by the "maxOccurs" attribute of the key element. This signifies more than one occurrence of the service in the given registry. Other particular schemas may also be used in other implementations.

Configuring the DHT 106 to store references to multiple entries in different UDDI registries 102 is useful because there could be multiple UDDI registries 102 associated with a given service query. For example, consider a service query on the search name "office supplies". Applying the DHT hash function 204 to the service name 202 of "office supplies" generates a DHT key 206 which may then be used to perform a look-up to the DHT 106. The look-up may return multiple references, for example, a first reference to an entry in the local UDDI registry 102 belonging to a first office supply company and a second reference to another entry in a different local UDDI registry 102 belonging to a second office supply company.

Figure 4:
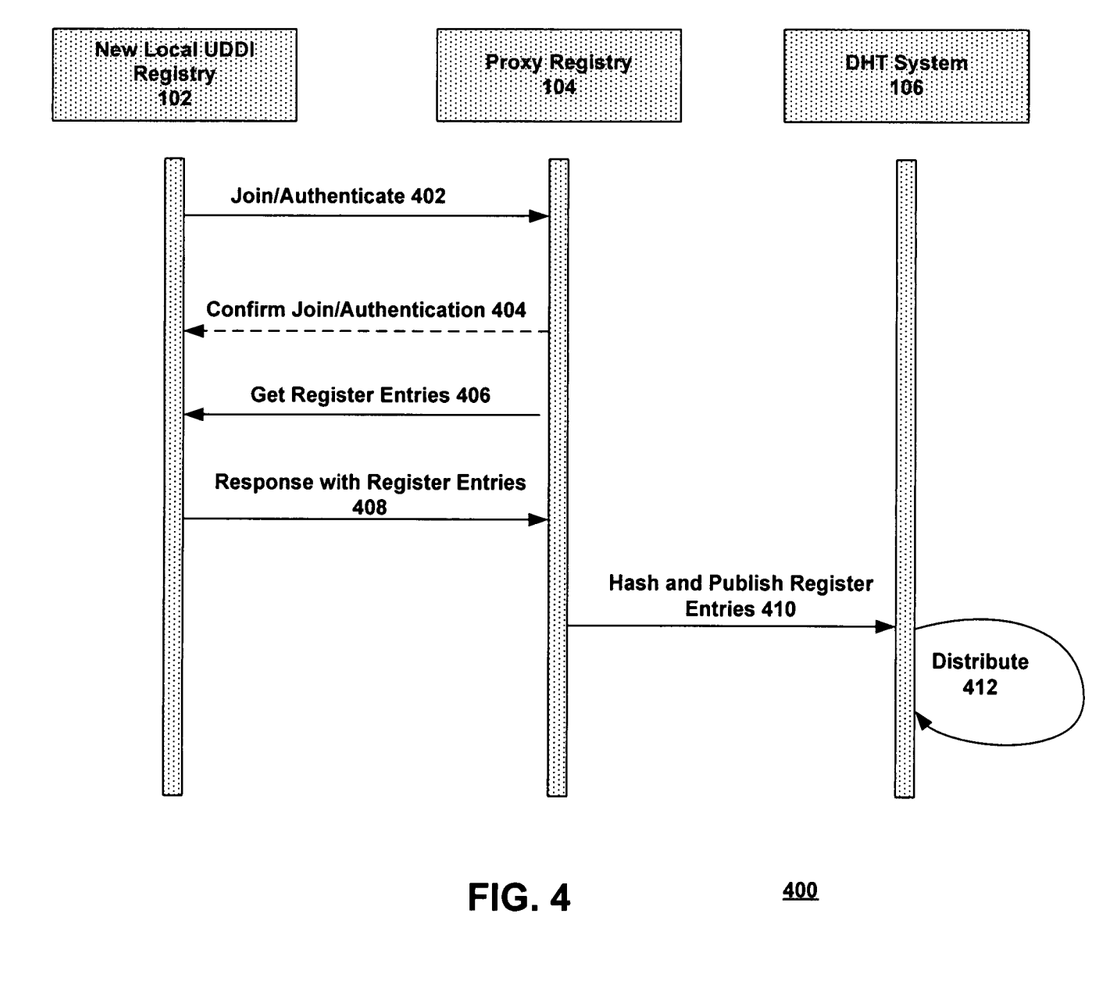
FIG. 4 is a sequence diagram illustrating a method of adding a new local UDDI registry to the system in accordance with an embodiment of the invention.
Figure 5:
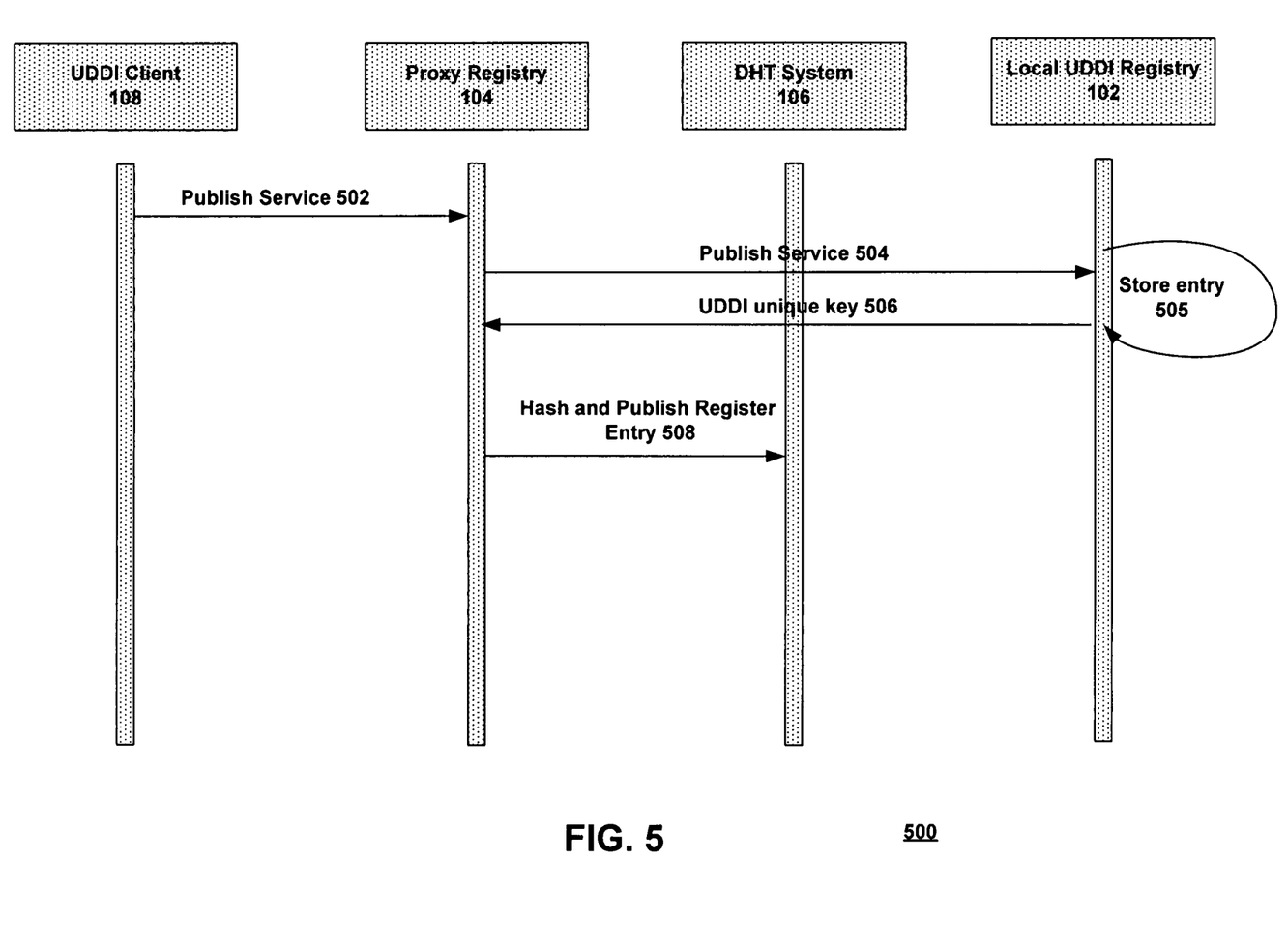
FIG. 5 is a sequence diagram illustrating a method of publishing a web service to the system in accordance with an embodiment of the invention.
Figure 6:
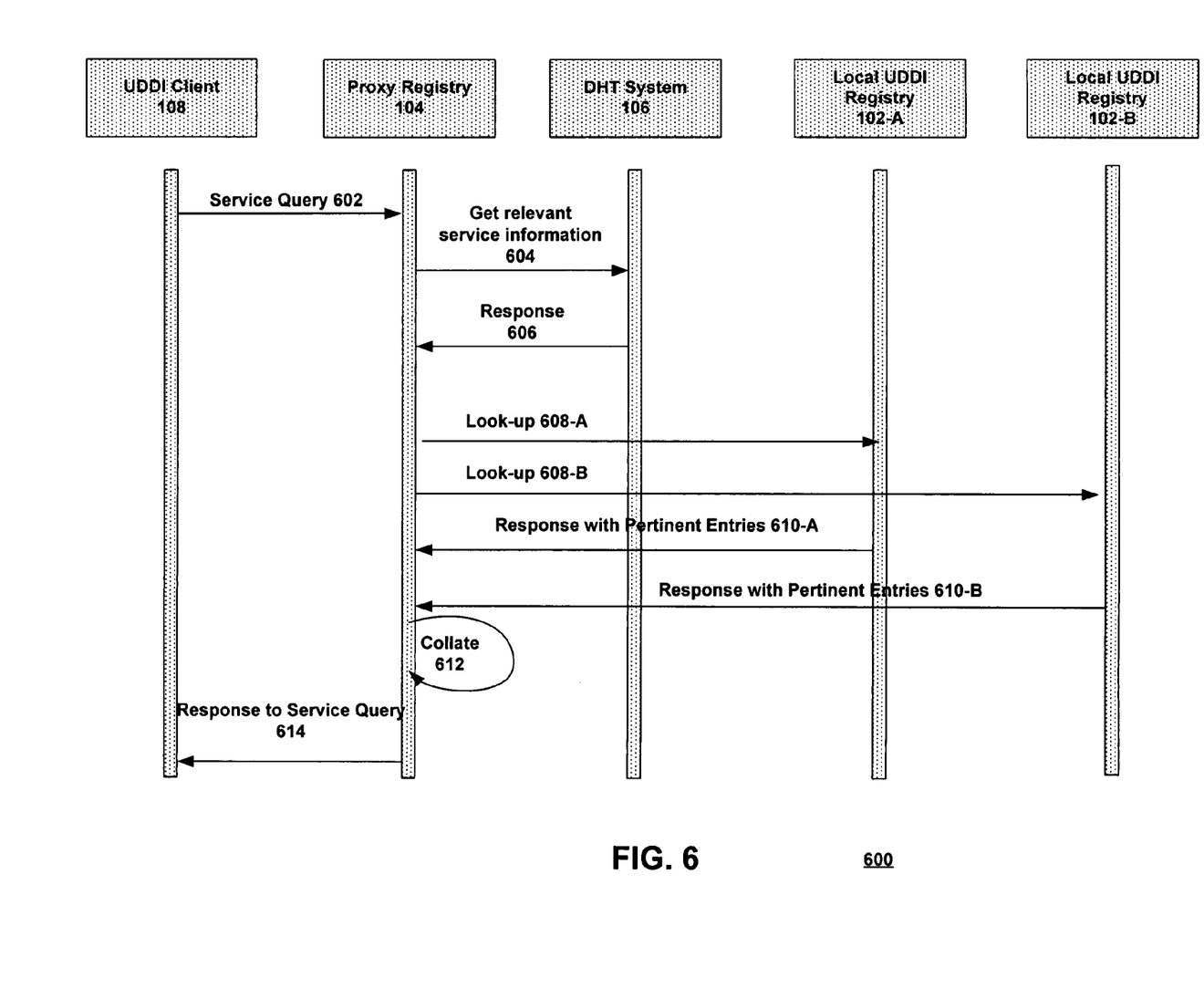
FIG. 6 is a sequence diagram illustrating a method of querying for services in accordance with an embodiment of the invention.

Advantageously, use of the DHT 106 in accordance with the present disclosure provides a simple interface consisting of put( ) and get( ) operations upon which it is easy to build applications. FIGS. 4 through 6 are sequence diagrams showing such operations in use.

FIG. 4 is a sequence diagram illustrating a method 400 of adding a new local UDDI registry 102 to the system 101 in accordance with an embodiment of the invention. As shown in FIG. 4, the new local UDDI registry 102 registers itself with the proxy UDDI registry 104. This registration may comprise, for example, the following steps. A join and authenticate message 402 may be sent from the new local UDDI registry 102 to the proxy registry 104. The proxy registry 104 then determines whether the new local UDDI registry 102 is authorized to join the system 101. If authorization is confirmed, then the proxy registry 104 may send a confirming message 404 to the new local UDDI registry 102.

In addition, the proxy registry 104 may also send a query message 406 to get the registry entries from the new local UDDI registry 102. The new local UDDI registry 102 would then respond by sending the register entries 408 to the proxy registry 104.

The proxy registry 104 has access to the DHT system 106 and so is able to hash and publish 410 these register entries 408 to the DHT 106. Preferably, most or all useful search terms in the entries 408 are hashed and published 410 to the DHT 106. The DHT system 106 may then distribute and/or redistribute 412 stored objects amongst its nodes in accordance with the scheme of the particular DHT being utilized.

FIG. 5 is a sequence diagram illustrating a method 500 of publishing a web service to the system 101 in accordance with an embodiment of the invention. As shown in FIG. 5, a UDDI client system 108 may initiate the process by publishing 502 the service to its nearby proxy UDDI registry 104.

The proxy registry 104 in turn publishes 504 the service with a local UDDI registry 102. The local UDDI registry 102 stores 505 the service information as an entry therein, and generates and returns a unique UDDI key 506 to the proxy registry 104.

With the UDDI key for the new register entry (and the address of the pertinent local UDDI registry 102), the proxy registry 104 is able to hash and publish the register entry 508 to the DHT system 106. Preferably, most or all useful search terms in the entry are hashed and published 508 to the DHT 106.

FIG. 6 is a sequence diagram illustrating a method 600 of querying for services in accordance with an embodiment of the invention. As shown in FIG. 6, a UDDI client system 108 may initiate the process by sending a service query 602 to its nearby proxy UDDI registry 104.

The proxy registry 104 in turn contacts the DHT system 106 so as to get 604 the service information which is relevant to the service query. The DHT 106 responds 606 to the proxy registry 104 with the relevant service information. For example, the relevant service information may comprise the addresses (e.g., the query URLs) of the relevant registries 102 and identifiers (e.g., unique UDDI keys) for the pertinent entries therein.

The proxy registry 104 may then look-up 608 the pertinent entries to each of the relevant local UDDI registries 102. The look-ups 608 may be performed because the proxy registry 104 has the unique UDDI keys for the pertinent register entries. The relatively fast look-ups 608 advantageously avoid the need to repeat the search based on the service query at each of the relevant UDDI registries 102. Each relevant UDDI registry 102 responds 610 with the pertinent entries therein to that proxy registry 104. Of course, though look-ups (608-A and 608-B) and responses (610-A and 610-B) are shown for two relevant UDDI registries (102-A and 102-B) in the example of FIG. 6, there may be any number of look-ups/responses, depending upon the earlier response 606 received from the DHT 106. In an alternate embodiment, the proxy registry 104 may instead forward the search query to the relevant local registries 102.

The proxy registry 104 collates 612 the information from the received entries and sends a collated response 614 to the service query back to the querying UDDI client 108. If the expected responses 610 from the UDDI registries 102 are not received within a configurable time limit, then the proxy registry 104 may be configured to send a partial response to the service query back to the querying UDDI client 108.

One specific embodiment of the above-discussed distributed system 101 utilizes the "Bamboo DHT" code for implementing the DHT 106. (See, for example, "Handling churn in a DHT", S. Rhea, D. Geels, T. Roscoe, and J. Kubiatowicz, Proceedings of the USENIX Annual Technical Conference, June 2004.) Other embodiments may use different specific DHT schemes.

One specific embodiment of the above-discussed distributed system 101 implements the proxy registry 104 by modifying the jUDDI source code to enable publishing, querying, and deleting service information from the DHT 106, and also to allow the querying of multiple registries and collating the response using the UDDI4j Java Class Library. Other embodiments may use different implementations for the proxy registry 104.

In one particular embodiment, to support case-insensitive searches, the proxy registry 104 may be configured to publish 504 the same service once using the name exactly as entered into the UDDI registry, and a second time with the name converted to all lower-case letters. Then, to do a case-insensitive search, the proxy registry 104 converts the query string into lower-case letters after receiving the service query 602.

In another particular embodiment, service queries based on the prefix of a service name may be supported. To support this efficiently the proxy registry 104 may be configured to take prefixes of varying length, and hash and publish 508 the address and identifier of the register entry multiple times into the DHT 106, once using each prefix. For example, the prefix sizes chosen in one deployment might be 5, 10, 15 and 20 characters. If a search based on the first 12 characters of a service name is submitted, then the proxy registry 104 may query 604 the DHT 106 with the first 10 characters of the search string, and then refine the search result to ensure that the match extends to the $12^{th}$ character.

In another particular embodiment, service queries based on regular expressions of search names may be supported. For example, a regular expression may be one with embedded wildcard characters. For instance, a search for "Garden%s" (where % is a wildcard character) should match both "Garden Supplies" and "Gardening Tools". This feature may be supported by using prefixes similarly to the way discussed above. The proxy registry 104 may be configured to take prefixes of varying length, and hash and publish 508 the address and identifier of the register entry multiple times into the DHT 106, once using each prefix. The proxy registry 104 would query 604 the DHT 106 with the longest available prefix in the regular expression, and then refine the results returned to ensure that the regular expression is matched.

The methods of FIGS. 4, 5, and 6 are discussed above in the context of a particular embodiment where multiple local UDDI registries are linked together using proxy UDDI registries and a DHT. More generally, in other embodiments, the methods of FIGS. 4, 5 and 6 may be applied in systems using proxy registries and a distributed index storage and retrieval system to link together multiple local resource/service registries.

Figure 7:
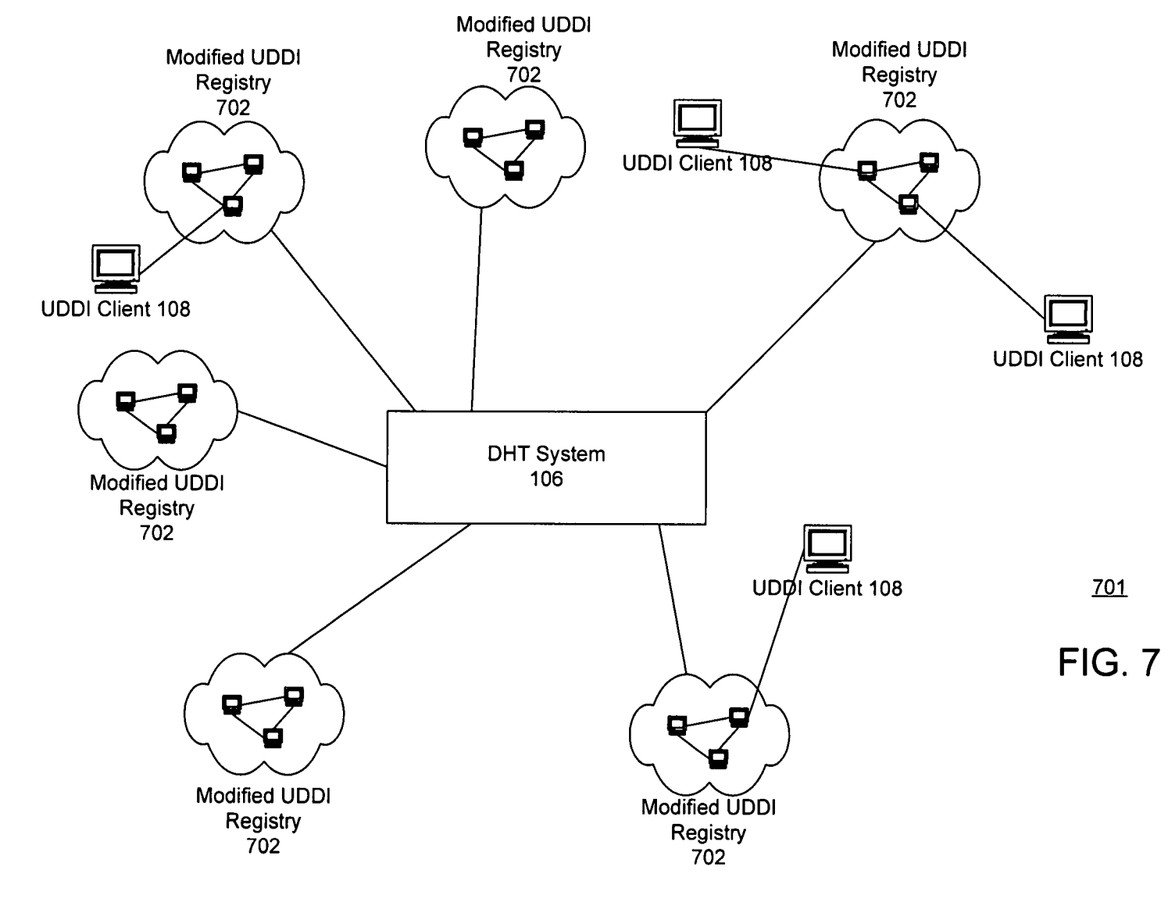
FIG. 7 is a schematic diagram depicting an alternate system architecture.

An alternate system architecture 701 is depicted in FIG. 7. Here, the proxy functionalities (as discussed above in relation to the proxy registries 104 in the system 101 of FIG. 1B) have been built into modified local registries 702. As such, the modified local registries 702 are able to directly access the DHT system 106 by way of the built-in proxy functionalities. In this alternate system 701, the client systems 108 would access the local registries 702 (instead of accessing the proxy registries 104 in the system 101 of FIG. 1B).

In the above description, numerous specific details are given to provide a thorough understanding of embodiments of the invention. However, the above description of illustrated embodiments of the invention is not intended to be exhaustive or to limit the invention to the precise forms disclosed. One skilled in the relevant art will recognize that the invention can be practiced without one or more of the specific details, or with other methods, components, etc. In other instances, well-known structures or operations are not shown or described in detail to avoid obscuring aspects of the invention. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined by the following claims, which are to be construed in accordance with established doctrines of claim interpretation.

What is claimed is:

1. A system for utilizing multiple local registries, the system comprising:
   a plurality of participating network nodes;
   a distributed index storage and retrieval system stored across the plurality of participating network nodes in a distributed manner; and
   at least one proxy registry including at least one processor, the at least one proxy registry to receive a search query from a client system, retrieve addresses of select local registries which have entries satisfying the search query from the distributed index storage and retrieval system, obtain said entries from said select local registries, collate the entries obtained, send a collated response to the client system, and publish new resources or services to a plurality of the select local registries,
   wherein in response to the publishing of the new resources or services from the at least one proxy registry, each of the plurality of select local registries is to assign a unique identifier to at least one of the new resources or services, store the unique identifier, and send the unique identifier to the at least one proxy registry, and
   wherein the unique identifiers assigned to the new resources or services are received by the at least one proxy registry, and the at least one proxy registry is to publish the new resources or services with the unique identifiers to the distributed index storage and retrieval system.

2. The system of claim 1, wherein the local registries comprise web service registries.

3. An apparatus configured as a proxy registry to facilitate searching for registry information in a decentralized architecture, the apparatus comprising:
   a processor to execute processor-executable code;
   memory to store the processor-executable code and data; and
   the processor-executable code is to receive a search query from a client system;
   the processor-executable code is to retrieve addresses of select local registries which have entries satisfying the search query from a distributed index storage and retrieval system;
   the processor-executable code is to obtain said entries from said select local registries;
   the processor-executable code is to collate the entries obtained and to send a collated response to the client system; and
   the processor-executable code is to publish new resources or services to a plurality of the select local registries, wherein in response to the publishing of the new resources or services from the proxy registry, each of the plurality of select local registries is to assign a unique identifier to at least one of the new resources or services, store the unique identifier, and send the unique identifier to the proxy registry, wherein the unique identifiers assigned to the new resources or services are received from the plurality of the select local registries, and the processor-executable code is to publish the new resources or services with the unique identifiers to the distributed index storage and retrieval system.

4. The apparatus of claim 3, wherein the entries are obtained by using unique identifiers to look-up the entries in the select local registries.

5. The apparatus of claim 3, wherein the entries are obtained by the proxy registry forwarding the search query to the select local registries.

6. The apparatus of claim 3, wherein the new resources or services are published multiple times in the distributed index storage and retrieval system using prefixes of a search term of varying lengths so as to support search queries based on prefixes.

7. The apparatus of claim 3, wherein the new resources or services are published in the distributed index storage and retrieval system using a search term converted to a same case so as to support case-insensitive queries.

8. The apparatus of claim 3, wherein the local registries comprise local UDDI registries and the client system comprises a UDDI client, and wherein the apparatus is configured to receive a service query from the UDDI client, retrieve URL addresses of select local UDDI registries which have entries satisfying the search query, and obtain said entries from said select local UDDI registries.

9. The apparatus of claim 3, wherein the processor-executable code is to add data from a new local registry to the distributed index storage and retrieval system by a procedure including getting entries from the new local registry, and hashing and publishing the entries from the new local registry to the distributed index storage and retrieval system.

10. The apparatus of claim 3, wherein the distributed index storage and retrieval system comprises a distributed hash table.

11. A method of using a proxy to search local registries, the method comprising:

receiving a search query by the proxy from a client system;

the proxy retrieving addresses of select local registries which have entries satisfying the search query from a distributed index storage and retrieval system;

the proxy obtaining said entries from said select local registries;

the proxy collating the entries obtained and sending a collated response to the client system;

the proxy publishing new resources or services to a plurality of the select local registries, wherein in response to the publishing of the new resources or services from the proxy, each of the plurality of select local registries is to assign a unique identifier to at least one of the new resources or services, store the unique identifier, and send the unique identifier to the proxy; and the proxy receiving the unique identifiers assigned by the plurality of the select local registries to the new resources or services, and publishing the new resources or services with the unique identifiers to the distributed index storage and retrieval system.

12. The method of claim 11, wherein the entries are obtained by using unique identifiers to look-up the entries in said local registries.

13. The method of claim 11, wherein the entries are obtained by forwarding the search query to said local registries.

14. The system of claim 1 wherein the entries comprise information regarding different services relative to one another.

15. The system of claim 1 wherein the select local registries are physically distinct from the nodes.

16. The apparatus of claim 3 wherein the entries include keys to distinguish the entries from each other, the addresses are to distinguish the select local registries from each other, the addresses do not explicitly identify the entries, and the addresses are different from the keys.

17. The apparatus of claim 3 wherein the select local registries are physically distinct from the distributed index storage and retrieval system.

18. The method of claim 11 wherein the client system is physically distinct from the proxy and is remotely located from the proxy and wherein the proxy is configured to receive the search query from the client system via a network connecting the proxy to the client system.

19. The method of claim 11 wherein prior to the retrieving of the addresses of the select local registries, the proxy is unaware of at least one of the select local registries.

* * * * *